United States Patent
Kondo et al.

(10) Patent No.: US 12,249,160 B2
(45) Date of Patent: Mar. 11, 2025

(54) OBJECT ASSESSMENT DEVICE, STORAGE MEDIUM STORING COMPUTER PROGRAM FOR OBJECT ASSESSMENT, AND OBJECT ASSESSMENT METHOD

(71) Applicant: TOYOTA JIDOSHA KABUSHIKI KAISHA, Toyota (JP)

(72) Inventors: Suzuka Kondo, Nishitokyo (JP); Eiki Kitagawa, Tokyo-to (JP); Shota Fujii, Tokyo-to (JP); Yu Okada, Ichikawa (JP); Soichi Yoshino, Ichikawa (JP); Takuo Kaneko, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 17/979,413

(22) Filed: Nov. 2, 2022

(65) Prior Publication Data
US 2023/0177843 A1 Jun. 8, 2023

(30) Foreign Application Priority Data
Dec. 7, 2021 (JP) .................... 2021-198577

(51) Int. Cl.
*G06V 20/58* (2022.01)
*G01S 17/89* (2020.01)
(Continued)

(52) U.S. Cl.
CPC .............. *G06V 20/58* (2022.01); *G01S 17/89* (2013.01); *G01S 17/931* (2020.01); *G06V 20/10* (2022.01)

(58) Field of Classification Search
CPC ........ G06V 20/58; G06V 20/10; G01S 17/89; G01S 17/931; G01S 17/42; G01S 17/66; G01V 9/00
See application file for complete search history.

(56) References Cited

U.S. PATENT DOCUMENTS 8,700,251 B1* 4/2014 Zhu ................. B60W 60/00276
701/25
2010/0278392 A1* 11/2010 Nagaoka .............. G06V 40/103
382/106

(Continued)

FOREIGN PATENT DOCUMENTS

JP 2005-145196 A 6/2005
JP 2009-301400 A 12/2009

(Continued)

*Primary Examiner* — Harry Y Oh
*Assistant Examiner* — Danielle M Jackson
(74) *Attorney, Agent, or Firm* — Oliff PLC

(57) ABSTRACT

An object assessment device determines whether or not an object is present within a predetermined range, and has a processor configured to determine whether or not first object detection information detected at a first detection time point and second object detection information detected at a second detection time point after the first detection time point, are detecting a same object, determine whether or not a predetermined region including a location of the vehicle at the second detection time point satisfies predetermined terrain condition, when it has been determined that the same object has not been detected, determine that the object is present within the predetermined range from the vehicle, when it has been determined that the same object has been detected, or when it has been determined that the predetermined region including the location of the vehicle satisfies the predetermined terrain condition, and give notification of the assessment result.

4 Claims, 11 Drawing Sheets

(51) Int. Cl.
    *G01S 17/931*       (2020.01)
    *G06V 20/10*        (2022.01)

(56)              References Cited

U.S. PATENT DOCUMENTS

| | | | |
|---|---|---|---|
| 2012/0212617 A1* | 8/2012 | Wang | G08G 1/0175 |
| | | | 348/149 |
| 2015/0029042 A1* | 1/2015 | Ikeya | G01S 7/41 |
| | | | 340/934 |
| 2017/0036679 A1 | 2/2017 | Takeda | |
| 2018/0039269 A1* | 2/2018 | Lambermont | G05D 1/81 |
| 2018/0061238 A1* | 3/2018 | Lei | G08G 1/167 |
| 2018/0354510 A1 | 12/2018 | Miyata | |
| 2019/0018410 A1 | 1/2019 | Ando | |
| 2022/0076032 A1* | 3/2022 | Jain | G06V 10/955 |

FOREIGN PATENT DOCUMENTS

| | | |
|---|---|---|
| JP | 2015-161968 A | 9/2015 |
| JP | 2016-103131 A | 6/2016 |
| JP | 2017-035902 A | 2/2017 |
| JP | 2019-001183 A | 1/2019 |
| JP | 2019-020782 A | 2/2019 |

* cited by examiner

OBJECT ASSESSMENT DEVICE, STORAGE MEDIUM STORING COMPUTER PROGRAM FOR OBJECT ASSESSMENT, AND OBJECT ASSESSMENT METHOD

FIELD

The present disclosure relates to an object assessment device, to a storage medium storing a computer program for object assessment, and to an object assessment method.

BACKGROUND

An automatic control system mounted in a vehicle creates a traveling route for the vehicle based on the current location of the vehicle, the destination location of the vehicle, and map information, and controls the vehicle so that it travels along the traveling route.

The automatic control system controls the vehicle so that at least a predetermined distance is maintained between the vehicle and other vehicles in its vicinity. When the vehicle is to move from the traveling lane in which it is traveling to an adjacent lane, the automatic control system controls the vehicle so as to maintain at least the predetermined distance between the vehicle and other vehicles traveling on the traveling lane and other vehicles traveling on the adjacent lane.

The automatic control system also detects other vehicles around the vehicle using object detection information output from a sensor such as a camera mounted on the vehicle, at a predetermined timing (see Japanese Unexamined Patent Publication No. 2015-161968, for example).

SUMMARY

When the vehicle attempts to move between lanes, and another vehicle is detected using a sensor, during the current detection the automatic control system may lose sight of the other vehicle that has been detected during a previous detection. In such cases, if the automatic control system continues to move between lanes the vehicle can potentially approach too close to the other vehicle.

The reason for losing sight of other vehicle is that there is a cause of the detection of other vehicle using a sensor, and that other vehicle have moved out of the range where the sensor can detect the vehicle.

It is therefore an object of the present disclosure to provide an object assessment device that determines whether or not the same object is present based on the terrain condition at the second detection time point, when the same object is not detected at a first detection time point and a second detection time point.

According to one embodiment, the invention provides an object assessment device. The object assessment device is an object assessment device that determines whether or not an object is present within a predetermined range from a vehicle based on object detection information output from a sensor disposed in the vehicle, and the object assessment device has a first assessment unit that determines whether or not first object detection information detected at a first detection time point and second object detection information detected at a second detection time point which is after the first detection time point, are detecting a same object, a second assessment unit that determines whether or not a predetermined region including a location of the vehicle at the second detection time point satisfies a predetermined terrain condition, when it has been determined that the same object has not been detected by the first assessment unit, a third assessment unit that determines that the object is present within the predetermined range from the vehicle, when it has been determined that the same object has been detected by the first assessment unit, or when it has been determined by the second assessment unit that the predetermined region including the location of the vehicle satisfies the predetermined terrain condition, and a notification unit that gives notification of the assessment result by the third assessment unit.

In this object assessment device, it is preferred for the predetermined terrain condition is different for when an object detected at the first detection time point is not detected at the second detection time point, and for when an object not detected at the first detection time point is detected at the second detection time point.

Also preferably, in the object assessment device, when an object detected at the first detection time point has not been detected at the second detection time point, the second assessment unit determines that the predetermined region including the location of the vehicle at the second detection time point satisfies the predetermined terrain condition when the predetermined region including the location of the vehicle at the second detection time point does not include a lane or road that allows the object detected at the first detection time point to move out of the predetermined range at the second detection time point.

Also preferably, in the object assessment device, when an object not detected at the first detection time point has been detected at the second detection time point, the second assessment unit determines that the predetermined region including the location of the vehicle at, the second detection time point satisfies the predetermined terrain condition when the predetermined region including the location of the vehicle at the second detection time point does not include a branching road that branches from the traveling road on which the vehicle is traveling.

The object assessment device also preferably has a third assessment unit that, when it has been determined that the same object has not been detected by the first assessment unit, and an object detected at the first detection time point has not been detected at the second detection time point, determines whether or not a second object different from the object detected at the first detection time point has been detected in a second area that is smaller than the predetermined range at the second detection time point, and a fourth assessment unit that, when the second object has been detected, determines that the first object detection information and the second object detection information are detecting the same object.

According to another embodiment, a non-transitory storage medium storing a computer program for object assessment is provided. The computer program for object assessment is a computer program for object assessment that determines whether or not an object is present within a predetermined range from a vehicle based on object detection information output from a sensor disposed in the vehicle, and the program causes a processor execute a process. The process includes determining whether or not first object detection information detected at a first detection time point and second object detection information detected at a second detection time point which is after the first detection time point, are detecting the same object, determining whether or not a predetermined region including a location of the vehicle satisfies a predetermined terrain condition at the second detection time point, when it has been determined that the same object is not being detected, determining that the object is present within the predetermined range from the vehicle, when it has been determined that the same object has been detected, or when it has been determined that the predetermined region including the location of the vehicle satisfies the predetermined terrain condition, and giving notification of the assessment result of whether or not the object is present within the predetermined range from the vehicle.

According to yet another embodiment of the invention, an object assessment method carried out by an object assessment device is provided. The object assessment method is an object assessment method that determines whether or not an object is present within a predetermined range from a vehicle based on object detection information output from a sensor disposed in the vehicle, and the method includes determining whether or not first object detection information detected at a first detection time point and second object detection information detected at a second detection time point which is after the first detection time point, are detecting the same object, determining whether or not a predetermined region including a location of the vehicle satisfies a predetermined terrain condition at the second detection time point, when it has been determined that the same object is not being detected, determining that the object is present within the predetermined range from the vehicle, when it has been determined that the same object has been detected, or when it has been determined that the predetermined region including the location of the vehicle satisfies the predetermined terrain condition, and giving notification of the assessment result of whether or not the object is present within the predetermined range from the vehicle.

The object assessment device of the disclosure can determine whether or not the same object is present based on the terrain condition at the second detection time point, when the same object is not detected at a first detection time point and a second detection time point.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
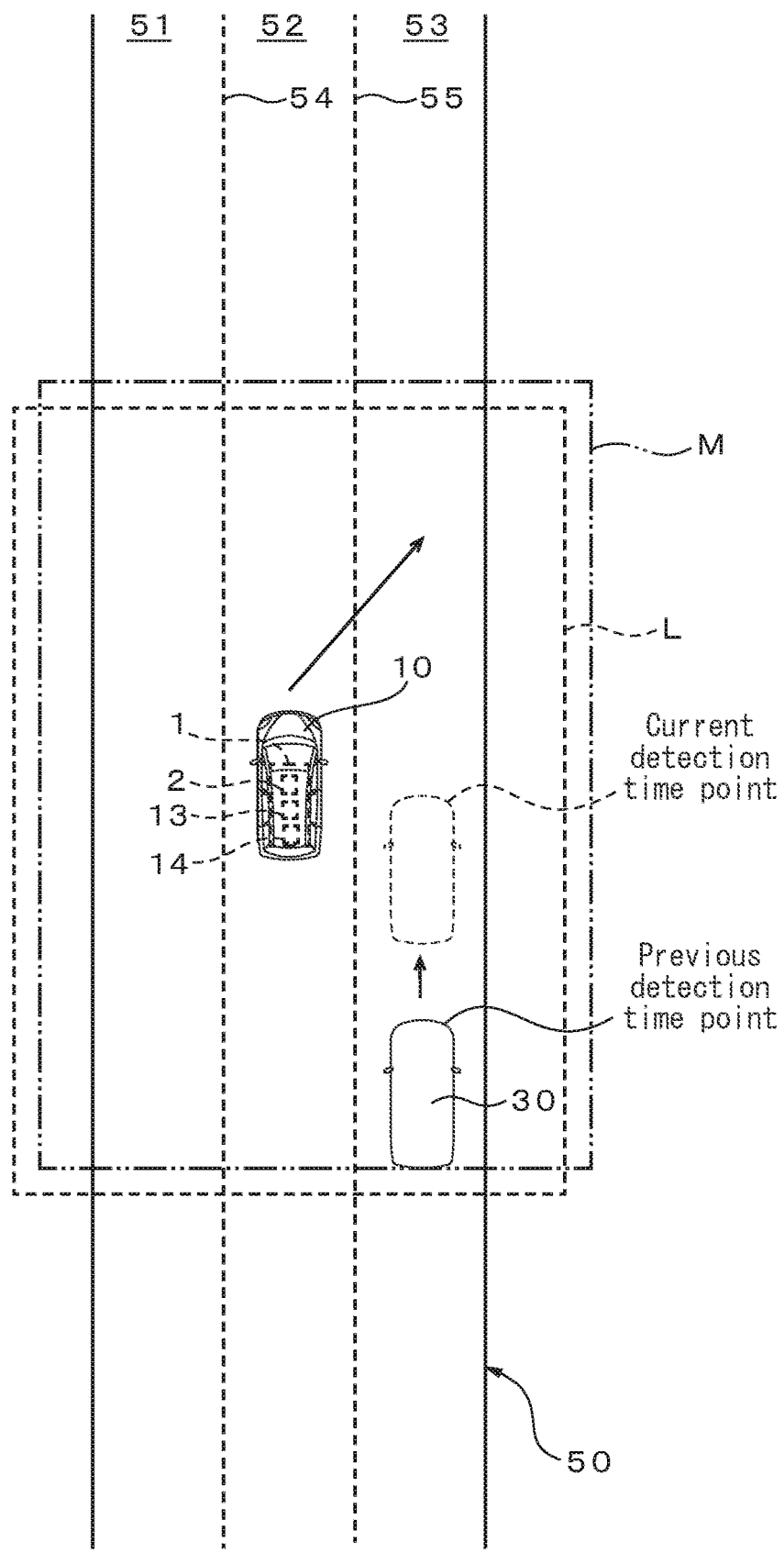
FIG. 1 is a diagram illustrating in overview the operation of a vehicle control system having an object assessment device of the embodiment.

FIG. 1 is a diagram illustrating in overview the operation of a vehicle control system 1 having an object assessment device 13 of the embodiment. Operation relating to object assessment processing by the object assessment device 13 disclosed herein will now be described in overview with reference to FIG. 1.

The vehicle 10 is traveling on a road 50. The road 50 has three lanes 51, 52, 53, with the lane 51 and lane 52 being divided by a lane marking line 54, and the lane 52 and lane 53 being divided by a lane marking line 55. The vehicle 10 is traveling on the lane 52.

The object assessment device 13 detects other objects within a detection area L from the vehicle 10, based on sensor information output from a sensor such as a camera 2 mounted in the vehicle 10 (an example of object detection information), for each predetermined timing. In the example shown in FIG. 1, the object assessment device 13 determines that a vehicle 30 is present within a detection area L from the vehicle 10. The object assessment device 13 gives notification of object assessment information indicating the location and traveling lane of the detected vehicle 30, to the traveling lane planning device 14 which generates a traveling lane plan for the vehicle 10. The object assessment device 13 uses the object identification information (object identification ID) for identification of other objects, to track the vehicle 30.

The object assessment device 13 determines whether or not sensor information detected at the previous detection time point and sensor information detected at the current detection time point are detecting the same vehicle 30. If the vehicle 30 detected at the previous detection time point (identified by predetermined identification ID) has not been detected at the current detection time point, then the object assessment device 13 determines that the same object is not being detected.

In the example shown in FIG. 1, the vehicle 30 detected at the previous detection time point is not detected at the current detection time point. Since the same object is not being detected, the object assessment device 13 determines whether or not the region M including the location of the vehicle 10 at the current detection time point satisfies predetermined terrain condition. The region M preferably includes the detection area L, for example.

In the example shown in FIG. 1, the region M including the location of the vehicle 10 at the current detection time point does not include a lane or road in which the vehicle 30 detected at the previous detection time point can move out of the detection area L at the current detection time point, and therefore it is unlikely that the reason that the vehicle 30 was not detected at the current detection time point is that the vehicle 30 has moved out of the detection area L of the sensor 2. The object assessment device 13 determines that the region M including the location of the vehicle 10 satisfies the predetermined terrain condition.

Since the region M including the location of the vehicle 30 satisfies the predetermined terrain condition, the object assessment device 13 determines that the vehicle 10 is present within the detection area L from the vehicle 10.

The object assessment device 13 notifies the traveling lane planning device 14 of object assessment information indicating that the vehicle 30 is present within the detection area L from the vehicle 10. However, the object assessment information does not include information indicating the location or traveling lane of the vehicle 30.

The traveling lane planning device 14 that has been notified of the object assessment information indicating only presence within the detection area L from the vehicle 10 generates a new traveling lane plan for the vehicle 10 to delay starting of the lane change by a predetermined length of time if, for example, the current traveling lane plan included movement of the vehicle 10 from the lane 52 to the lane 53. This is because the vehicle 10 and vehicle 30 may be too close together if the vehicle 10 has immediately executed movement between lanes.

When the vehicle 30 that has been detected at the previous detection time point has also been detected at the current detection time point, the object assessment device 13 notifies the traveling lane planning device 14 of object assessment information indicating the location and traveling lane of the detected vehicle 30.

When the region M including the location of the vehicle 10 does not satisfy predetermined terrain condition, then it may be that the vehicle 30 has moved outside of the detectable range of the sensor 2 and therefore was not detected at the current detection time point.

Since the object assessment device 13 can determine whether or not the same object is present based on the terrain condition at the current detection time point when the same object has not been detected at the previous detection time point and the current detection time point, the valid detection results for an object can be reflected in the vehicle control.

Figure 2:
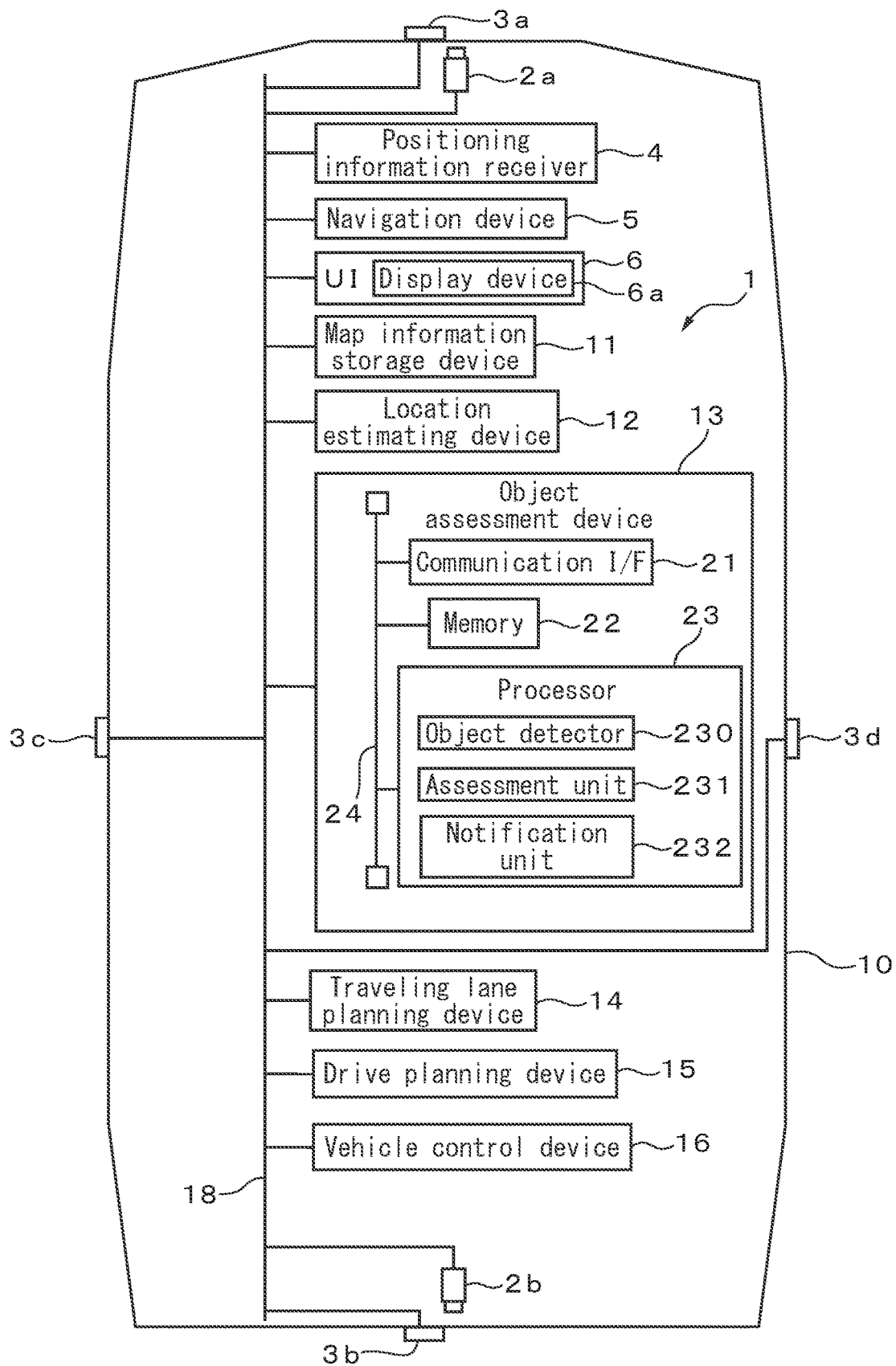
FIG. 2 is a general schematic drawing of a vehicle in which the object assessment device of the embodiment is mounted.

FIG. 2 is a general schematic drawing of a vehicle 10 in which the vehicle control system 1 is mounted. The vehicle control system 1 has cameras 2a, 2b, LiDAR sensors 3a to 3d, a positioning information receiver 4, a navigation device 5, a user interface (UI) 6, a map information storage device 11, a location estimating device 12, an object assessment device 13, a traveling lane planning device 14, a drive planning device 15 and a vehicle control device 16. The vehicle control system 1 may also have a radar sensor, as another distance sensor (not shown) for measurement of the distance of the vehicle 10 to surrounding objects.

The cameras 2a, 2b, LiDAR sensors 3a to 3d, positioning information receiver 4, navigation device 5, UI 6, map information storage device 11, location estimating device 12, object assessment device 13, traveling lane planning device 14, drive planning device 15 and vehicle control device 16 are connected in a communicable manner through an in-vehicle network 18 that conforms to controller area network standards.

The cameras 2a, 2b are examples of imaging units provided in the vehicle 10. The camera 2a is mounted inside the vehicle 10 and directed toward the front of the vehicle 10. The camera 2b is mounted inside the vehicle 10 and directed toward the rear of the vehicle 10. The cameras 2a, 2b each take a camera image in which the environment of a predetermined region ahead of and behind the vehicle 10 is shown, at a camera image photograph time with a predetermined cycle, for example. For a camera image, roads within a predetermined region ahead of or behind the vehicle 10 and road features such as road surface lane marking lines may be represented in the camera image as an example of object detection information. A camera image taken by the camera 2a may also have other vehicles located at the left front, front and right front of the vehicle 10. A camera image taken by the camera 2b may have other vehicles located at the left rear, rear and right rear of the vehicle 10. The cameras 2a, 2b each have a 2D detector composed of an array of photoelectric conversion elements with visible light sensitivity, such as a CCD or C-MOS, and an imaging optical system that forms an image of the photographed region on the 2D detector.

Each time a camera image is taken, each of the cameras 2a, 2b outputs the camera image and the camera image photograph time at which the camera image was taken, through the in-vehicle network 18 to the location estimating device 12 and object assessment device 13, etc. The camera image is also used for processing at the location estimating device 12 to estimate the location of the vehicle 10. At the object assessment device 13, the camera image is used for processing to detect other objects surrounding the vehicle 10.

The LiDAR sensors 3a, 3b, 3c, 3d are mounted on the outer sides of the vehicle 10, for example, being directed toward the front, rear, left side and right side of the vehicle 10, respectively. The LiDAR sensors 3a to 3d respectively synchronize and emit a pulsed laser to the front, rear, left and right of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the laser has been emitted. Each of the LiDAR sensors 3a, 3b, 3c, 3d outputs the reflected wave information that includes the laser emission direction and the time required for the reflected wave to return, together with the reflected wave information acquisition time at which the laser was emitted, through the in-vehicle network 18 to the object assessment device 13. The reflected wave information is an example of object detection information. At the object assessment device 13, the reflected wave information is used for processing to detect other objects surrounding the vehicle 10. The reflected wave information acquisition time preferably matches the camera photograph time, for example.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, etc, each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12 and the traveling lane planning device 14, etc, via the in-vehicle network 18.

The UI 6 is an example of the notification unit. The UI 6, controlled by the navigation device 5, notifies the driver of the vehicle 10 traveling information. The UI 6 also creates an operation signal in response to operation of the vehicle 10 by the driver. The traveling information of the vehicle 10 includes information relating to the current location of the vehicle and the current and future route of the vehicle, such as the navigation route. The UI 6 has a display device 6a such as a liquid crystal display or touch panel, for display of the traveling information. The UI 6 may also have an acoustic output device (not shown) to notify the driver of traveling information. The UI 6 also has a touch panel or operating button, for example, as an input device for inputting operation information from the driver to the vehicle 10. The operation information may be, for example, a destination location, transit points, vehicle speed or other control information of the vehicle 10. The UI 6 outputs the input operation information to the navigation device 5 and the vehicle control device 16, etc, via the in-vehicle network 18.

The map information storage device 11 stores wide-area map information for a relatively wide area (an area of 10 to 30 km$^2$, for example) that includes the current location of the vehicle 10. The map information preferably has high precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 m$^2$ to 10 km$^2$), through the in-vehicle network 18 to the location estimating device 12, object assessment device 13, traveling lane planning device 14, drive planning device 15 and vehicle control device 16, etc.

The location estimating device 12 estimates the location of the vehicle 10 at the camera image photograph time, based on the road features surrounding the vehicle 10 represented in the camera image taken by the camera 2a. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object assessment device 13, traveling lane planning device 14, drive planning device 15 and vehicle control device 16, etc. The location estimating device 12 may estimate the location of the vehicle 10 based on the two camera images taken by the camera 2a and camera 2b.

The object assessment device 13 carries out object detection processing, assessment processing and notification processing. For this purpose, the object assessment device 13 has a communication interface (IF) 21, a memory 22 and a processor 23. The communication interface 21, memory 22 and processor 23 are connected via signal wires 24. The communication interface 21 has an interface circuit to connect the object assessment device 13 with the in-vehicle network 18.

All or some of the functions of the object assessment device 13 are functional modules driven by a computer program operating on the processor 23, for example. The processor 23 has an object detector 230, an assessment unit 231, and a notification unit 232. Alternatively, the functional module of the processor 23 may be a specialized computing circuit in the processor 23. The processor 23 has one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23.

The object detector 230 carries out object detection processing in which other objects around the vehicle 10 are detected at an object detection time with a predetermined cycle. The cycle for the object detection time is set based on the cycles for the camera photograph time and reflected wave information acquisition time. The object detector 230 detects other objects at the left front, front and right front of the vehicle 10, and their type, based on the camera image taken by the camera 2a. The object detector 230 also detects other objects at the left rear, rear and right rear of the vehicle 10, and their type, based on the camera image taken by the camera 2b. Other objects also include other vehicles traveling around the vehicle 10. The object detector 230 has a classifier that detects objects represented in the camera image, by inputting the image, for example. The classifier may use a deep neural network (DNN) that has been trained to detect objects represented in input images, for example. The object detector 230 used may also be an classifier other than a DNN. For example, the classifier used by the object detector 230 may be a support vector machine (SVM) that has been trained to output a confidence factor for representation of objects to be detected in the window, with the input being a feature descriptor (such as Histogram of Oriented Gradients, HOG, for example) calculated from a window set in the camera image. Alternatively, the object detector 230 may detect an object region by template matching between the image and a template in which an object to be detected is represented.

The object detector 230 also detects other objects at the left front, front and right front of the vehicle 10, based on reflected wave information output by the LiDAR sensor 3a, and detects other objects at the left rear, rear and right rear of the vehicle 10, based on reflected wave information output by the LiDAR sensor 3b. The object detector 230 also detects other objects on the left side of the vehicle 10, based on reflected wave information output by the LiDAR sensor 3c, and detects other objects on the right side of the vehicle 10, based on reflected wave information output by the LiDAR sensor 3d.

The object detector 230 determines the orientation of another object with respect to the vehicle 10 based on the location of the other object in the camera image, and may also determine the distance between the other object and the vehicle 10, based on the orientation and on the reflected wave information output by the LiDAR sensors 3a to 3d. The object detector 230 estimates the location of the other object represented in a world coordinate system based on the current location of the vehicle 10, and the distance of the other object from the vehicle 10 and its orientation, for example. The object detector 230 may also track another object to be detected from an updated image, by matching other objects detected in the updated camera image with objects detected in previous images, according to a tracking process based on optical flow. The object detector 230 also calculates the trajectory of another object being tracked, based on the location of the object in an image updated from a previous image, represented in the world coordinate system. The object detector 230 estimates the speed of another object with respect to the vehicle 10, based on changes in the location of the object over the course of time. The object detector 230 can also estimate the acceleration of another object based on changes in the location of the object over the course of time. In addition, the object detector 230 identifies the traveling lane in which the other object is traveling, based on the lane marking lines represented in the map information and the location of the object. The object detector 230 also determines, for example, whether another object is traveling in a traffic lane defined by two mutually adjacent lane marking lines situated on either side of the center location of the other object in the lateral direction.

When the object detector 230 detects a moving object including another vehicle as another object, it tracks the other object with object identification information identifying the other object. When another object with object identification information has not been detected within a predetermined period, the object detector 230 determines that the other object has been lost from view. When a structure such as a guard rail or side wall has been detected as the other object, the object detector 230 does not track it.

The object detector 230 notifies the assessment unit 231 and the notification unit 232 of object assessment information which includes information indicating the type of other object that was detected, the object identification information, information indicating its location, and information indicating its speed, acceleration and traveling lane. In addition, the object detector 230 outputs object assessment information to the traveling lane planning device 14, the drive planning device 15 and the vehicle control device 16, etc. The detection area in which other objects can be detected by the object detector 230 (for example, the detection area L in FIG. 1) is set based on the conditions and resolving power of the cameras 2a, 2b and the LiDAR sensors 3a to 3d. Other details regarding operation of the object assessment device 13 are described below.

At a traveling lane-planning creation time set with a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15 of the traveling lane plan.

The traveling lane planning device 14 also determines whether or not a lane change is necessary within the nearest driving zone selected from the navigation route, based on the traveling lane plan, the map information, the navigation route and the current location of the vehicle 10, and generates a lane change plan in accordance with the assessment results. The lane change plan includes a lane change schedule zone in the lane in which the vehicle 10 is traveling, where it is scheduled to move to an adjacent lane. Specifically, the traveling lane planning device 14 determines whether or not a lane change is necessary for moving to a traffic lane toward the destination location of the vehicle 10, based on the navigation route and the current location of the vehicle 10. The traveling lane planning device 14 determines whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. The traveling lane planning device 14 also generates a lane change plan in response to a driver request. Information indicating the speed of the vehicle 10 and its acceleration is acquired using a sensor (not shown) mounted on the vehicle 10.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other vehicles. The drive planning device 15 outputs the driving plan to the vehicle control device 16 for each driving plan generated.

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 18. The vehicle control device 16 also determines the amount of fuel injection according to a set accelerator level, and outputs a control signal corresponding to the amount of fuel injection to a drive unit (not shown) of the engine of the vehicle 10, via the in-vehicle network 18. Alternatively, the vehicle control device 16 may output a control signal corresponding to a set brake level to the brake (not shown of the vehicle 10, via the in-vehicle network 18.

For FIG. 2, the map information storage device 11, location estimating device 12, object assessment device 13, traveling lane planning device 14, drive planning device 15 and vehicle control device 16 were explained as separate devices (ECUs, for example), but all or some of them may be constructed in a single device.

Figure 3:
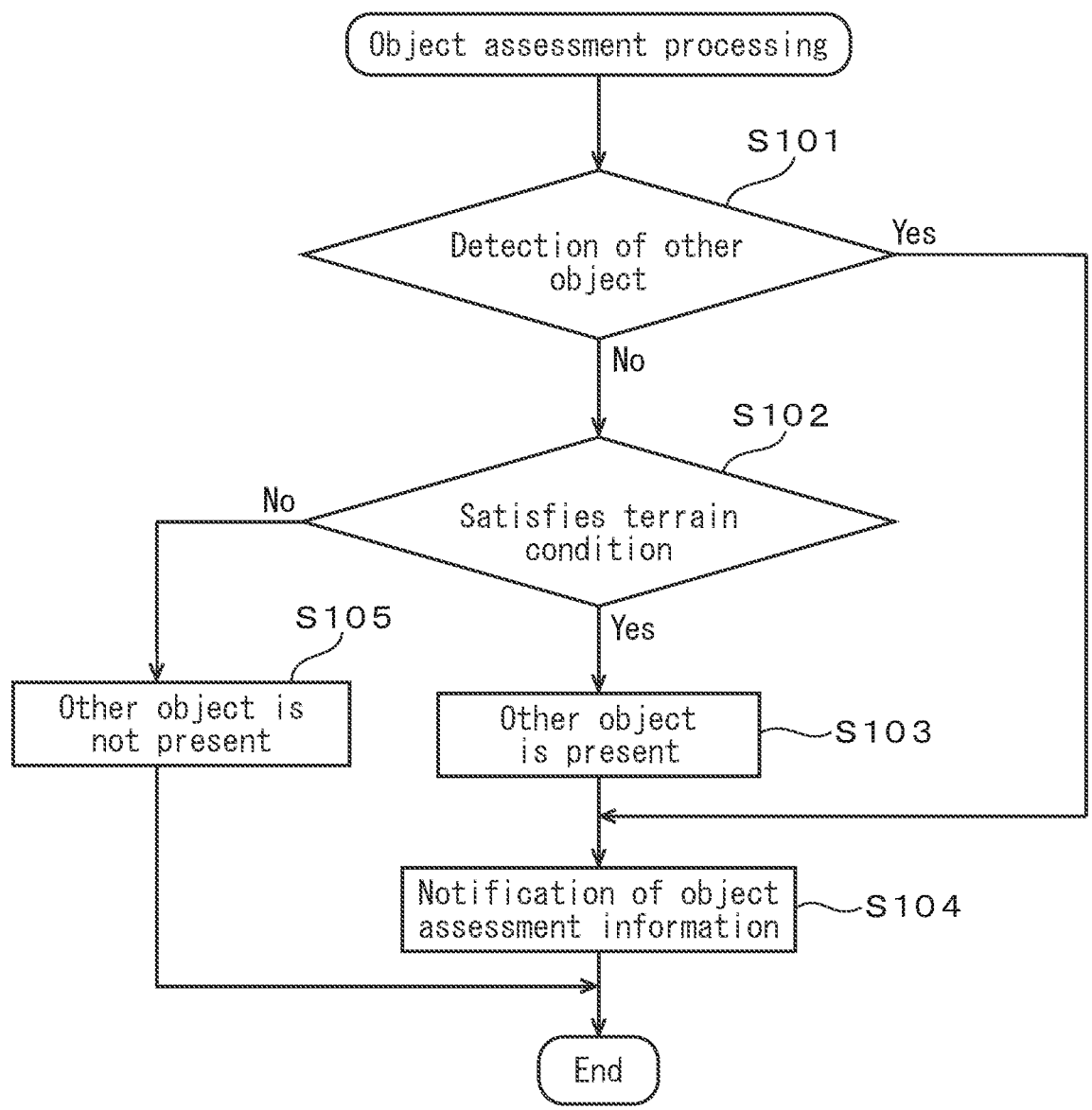
FIG. 3 is an example of an operation flow chart for object assessment processing by the object assessment device of the embodiment.

FIG. 3 is an example of an operation flow chart for object assessment processing by the object assessment device 13 of the embodiment. Object assessment processing by the object assessment device 13 will now be explained with reference to FIG. 3. The object assessment device 13 carries out object assessment processing according to the operation flow chart shown in FIG. 3, at an object assessment time having a predetermined cycle. The cycle of the object assessment time may be the same as the cycle of the object detection time, or preferably it is longer than the cycle of the object detection time. The previous object assessment time is an example of the first detection time point, and the next (current) object assessment time is an example of the second detection time point.

First, the assessment unit 231 determines whether or not object detection information detected at the previous detection time point and object detection information detected at the current detection time point are detecting the same object (step S101). The assessment unit 231 uses object assessment information input from the object assessment device 13 after the previous object assessment time and until the next object assessment time, as the detection results for other objects at the current detection time point. The assessment unit 231 also uses object assessment information input from the object assessment device 13 after the former previous object assessment time and until the next object assessment time, as the detection results for other objects at the previous detection time point.

When object identification information included in the previous detection results is also included in the current detection results, the assessment unit 231 determines that the object detection information detected at the previous detection time point and object detection information detected at the current detection time point are detecting the same object (step S101—Yes).

When object identification information included in the previous detection results is not included in the current detection results, or when object identification information not included in the previous detection results is included in the current detection results, the assessment unit 231 determines that the same object is not being detected (step S101—No).

When it has been determined that the same object is not being detected (step S101—No), the assessment unit 231 determines whether or not a predetermined region including the location of the vehicle 10 at the current detection time point satisfies predetermined terrain condition, based on map information step S102). The predetermined terrain condition is different for when an object detected at the previous detection time point is not detected at the current detection time point, and for when an object not detected at the previous detection time point is detected at the current detection time point.

The reason why object identification information included in previous detection results is not included in current detection results may be due to the object detection information detected at the current detection time point, or it may be because the other object has moved outside of the detectable range of the sensor. If the other object is not detected at the current detection time point due to movement of the other object outside of the detectable range of the sensor, then the detection results are valid. The detection results are invalid, however, if the other object is not detected at the current detection time point due to object detection information detected at the current detection time point.

The reason why object identification information not included in previous detection results is included in current detection results may be that a new object to be tracked has appeared in the detection area of the object detector 230 (for example, the detection area L in FIG. 1), or that an object that is not be tracked with object identification information (a structure such as a guard rail or side wall) has been erroneously detected as another object to be tracked. If another object has been detected at the current detection time point because the other object to be tracked has appeared in the detection area of the object assessment device 13, then the detection results are valid. The detection results are invalid, however, if another object that is not to be tracked with object identification information (a structure such as a guard rail or side wall) has been erroneously detected as another object to be tracked. The cause may therefore be attributed to object detection information detected at the current detection time point.

The predetermined region is preferably set so that it can be determined whether the detection results are valid or invalid. For example, the predetermined region (such as the region M in FIG. 1) preferably includes a detection area in which other objects can be detected by the object detector 230 (for example, the detection area L in FIG. 1).

The assessment unit 231 may also determine whether or not the predetermined region including the location of the vehicle 10 at the current detection time point satisfies predetermined terrain condition, based on road features such as a lane marking line on the road or a structure such as a guard rail or side wall, detected by the object detector 230 together with map information, or instead of map information.

When the predetermined region satisfies the predetermined terrain condition (step S102—Yes), the assessment unit 231 determines that the other object is present within the predetermined range of the vehicle 10 (step S103).

The notification unit 232 notifies the traveling lane planning device 14 of the assessment results from the assessment unit 231 (step S104), and thus completes the series of processing steps. When an object detected at the previous detection time point is not detected at the current detection time point, the notification unit 232 outputs object assessment information indicating that the other object detected at the previous detection time point is present within the detection area L from the vehicle 10, to the traveling lane planning device 14, drive planning device 15 and vehicle control device 16 (notification). However, the object assessment information does not include information indicating the location or traveling lane of the other object.

Even when an object not detected at the previous detection time point is detected at the current detection time point, the notification unit 232 outputs object assessment information indicating that the other object detected at the current detection time point is present within the predetermined area L from the vehicle 10, to the traveling lane planning device 14, drive planning device 15 and vehicle control device 16 (notification). The object assessment information includes information indicating the type of other object that was detected, the object identification information, information indicating its location, and information indicating its speed, acceleration and traveling lane.

When object detection information detected at the previous detection time point and object detection information detected at the current detection time point are detecting the same object (step S101—Yes), the notification unit 232 outputs object assessment information indicating that the other object detected at the current detection time point is present within the predetermined area L from the vehicle 10, to the traveling lane planning device 14, drive planning device 15 and vehicle control device 16 (notification). The object assessment information includes information indicating the type of other object that was detected, the object identification information, information indicating its location, and information indicating its speed, acceleration and traveling lane.

When the predetermined region does not satisfy the predetermined terrain condition, on the other hand (step S102—No), the assessment unit 231 determines that no other object is present (step S105), and thus completes the series of processing steps.

A first operating example for object assessment processing by the object assessment device 13 will now be explained with reference to FIG. 4 to FIG. 6.

Figure 4:
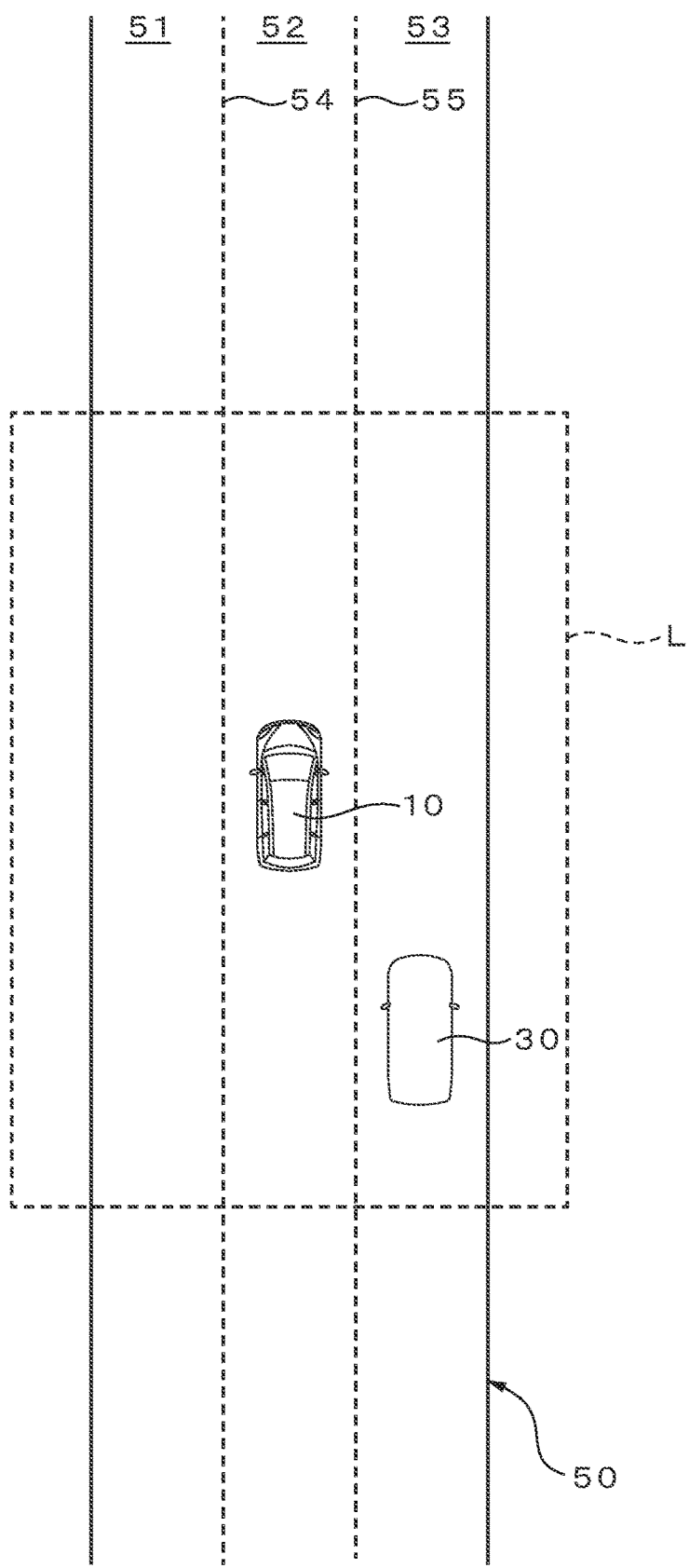
FIG. 4 is a diagram illustrating an operating example for object assessment processing with an object assessment device (1).

In the first operating example shown in FIG. 4, the vehicle 10 is traveling on a traffic lane 52 of a road 50, as in FIG. 1. According to the detection results at the previous detection time point, a vehicle 30 traveling on the lane 53 is detected in the detection area L. The vehicle 30 is identified by predetermined object identification information.

Figure 5:
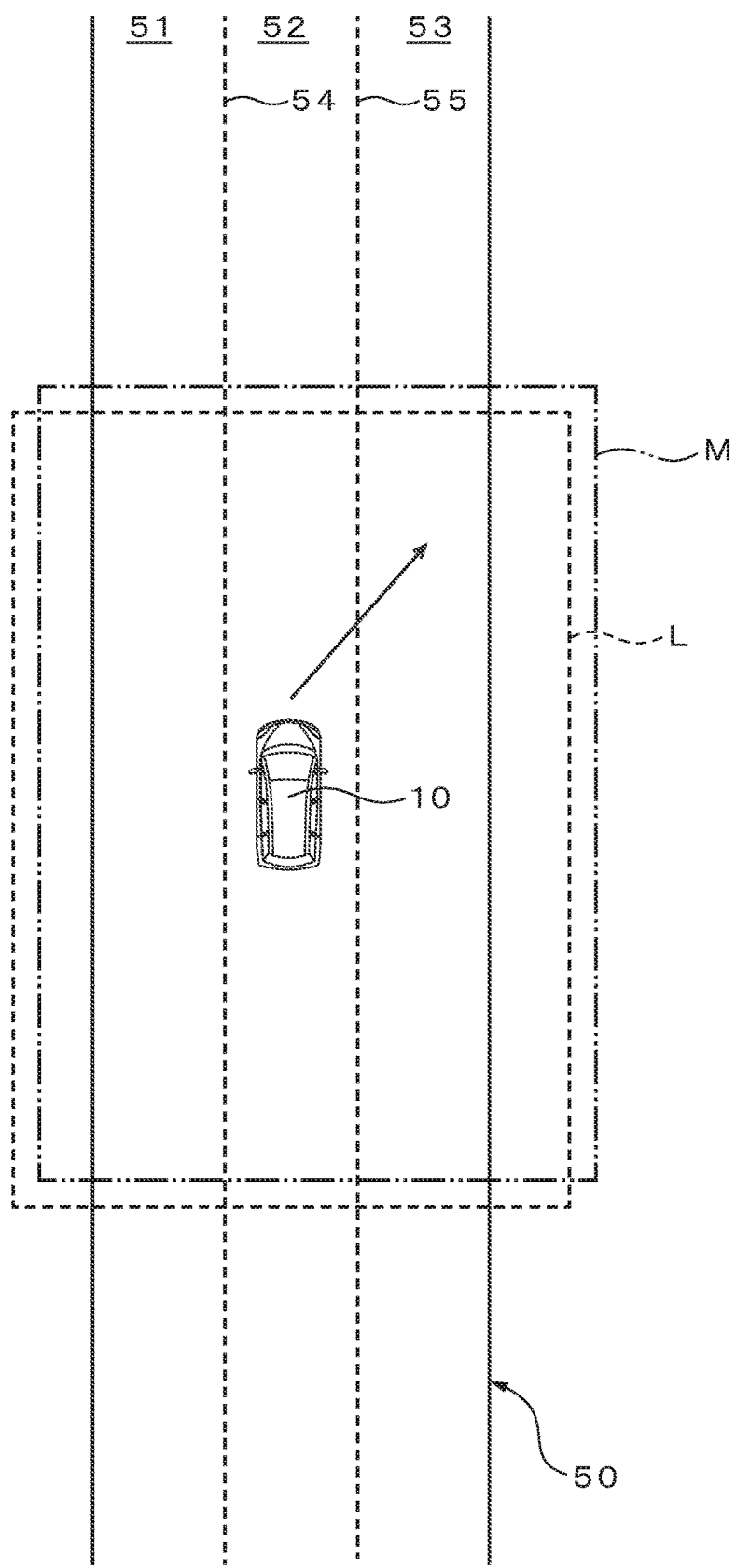
FIG. 5 is a diagram illustrating an operating example for object assessment processing with an object assessment device (2).

As shown in FIG. 5, according to the detection results for the current detection time point, the vehicle 30 identified by the predetermined object identification information was not detected in the detection area L. The object assessment device 13 determines that the object detection information detected at the previous detection time point and the object detection information detected at the current detection time point are not detecting the same object.

In the example shown in FIG. 5, the region M including the location of the vehicle 10 at the current detection time point does not include a lane or road which allows the vehicle 30 detected at the previous detection time point to move outside of the detection area L at the current detection time point. Therefore, the reason why the object identification information included in the previous object assessment information is not included in the current object assessment information may be attributed to the detection of the other object using a sensor. When the vehicle 30 detected at the previous detection time point is not detected at the current detection time point, the detection results are invalid and therefore the vehicle 30 detected at the previous detection time point may be present within the detection area L from the vehicle 10.

The object assessment device 13 determines that the region M including the location of the vehicle 10 at the current detection time point satisfies the predetermined terrain condition, and outputs object assessment information indicating that the vehicle 30 detected at the previous detection time point is present within the detection area L from the vehicle 10, to the traveling lane planning device 14, drive planning device 15 and vehicle control device 16 (notification). However, the object assessment information does not include information indicating the location or traveling lane of the other object.

When the traveling lane plan includes movement of the vehicle 10 between lanes, the traveling lane planning device 14 generates a traveling lane plan for the vehicle 10 to delay start of the lane change by a predetermined length of time. The predetermined length of time is preferably several times (such as 2 to 5 times) the cycle of the object detection time. This allows a traveling lane plan to be generated to take into account the detected vehicle 30 if the vehicle 30 is detected again at a later detection time point.

The traveling lane planning device 14 may avoid changing the start of a lane change when planning a lane change for the vehicle 10 to move from the lane 52 to the lane 51, and the vehicle 30 identified by the object identification information included in the previous object assessment information is traveling on the lane 53 which is not a destination of the vehicle 10.

Figure 6:
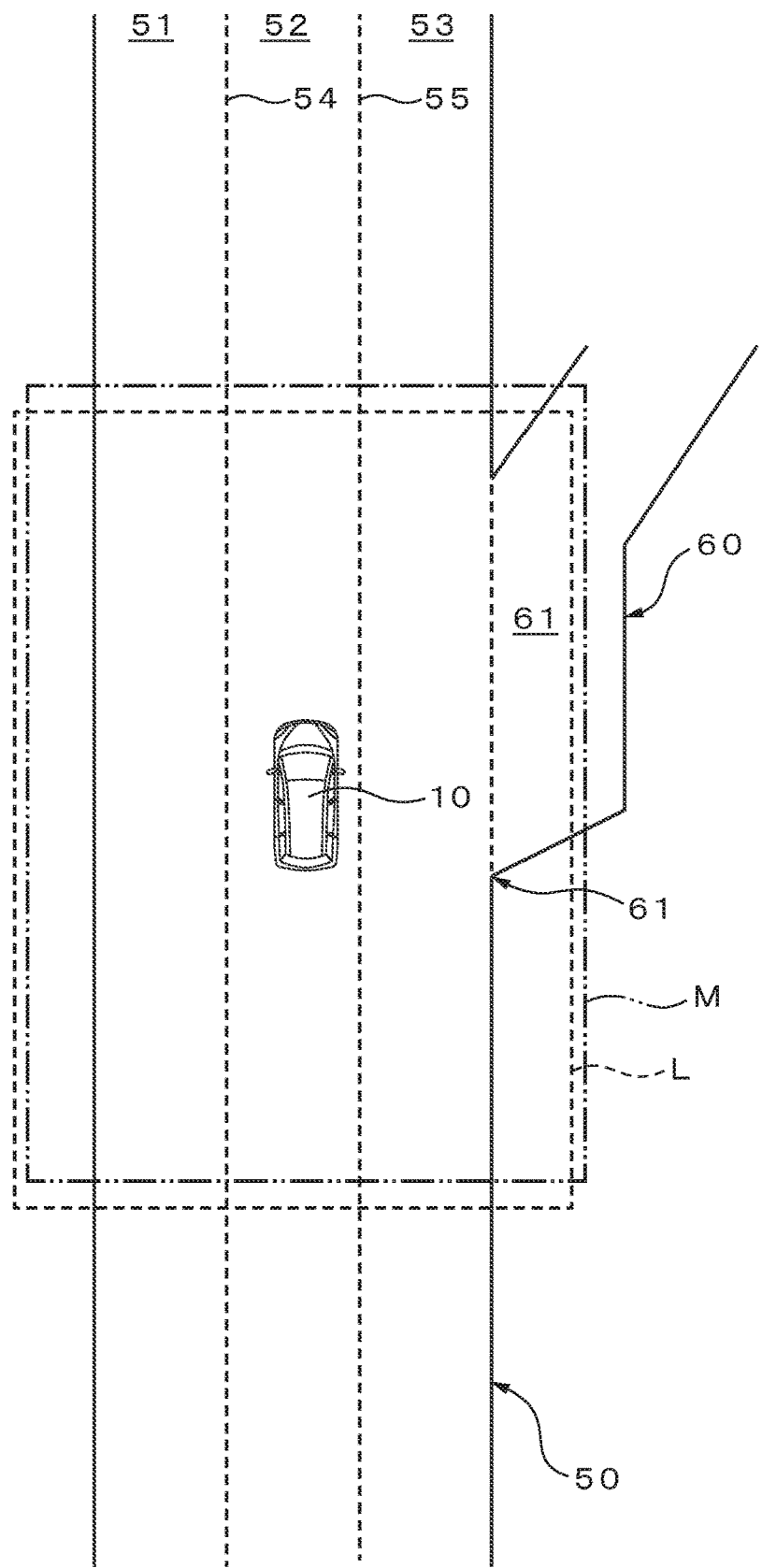
FIG. 6 is a diagram illustrating an operating example for object assessment processing with an object assessment device (3).

In the example shown in FIG. 6, on the other hand, the region M including the location of the vehicle 10 at the current detection time point includes a lane 61 and road 60 which allow the vehicle 30 detected at the previous detection time point to move outside of the detection area L at the current detection time point. The road 60 branches from the road 50 at the branching location 61. Therefore, the reason why the vehicle 30 detected at the previous detection time point is not detected at the current detection time point may be that the vehicle 30 has moved outside of the detection area L of the sensor.

The object assessment device 13 determines that the region M including the location of the vehicle 10 at the current detection time point does not satisfy the predetermined terrain condition. Since the detection results in which the vehicle 30 detected at the previous detection time point is not detected at the current detection time point are valid, it may be that the vehicle 30 is not present in the predetermined range from the vehicle 10 at the current detection time point.

A second operating example for object assessment processing by the object assessment device 13 will now be explained with reference to FIG. 7 to FIG. 9.

Figure 7:
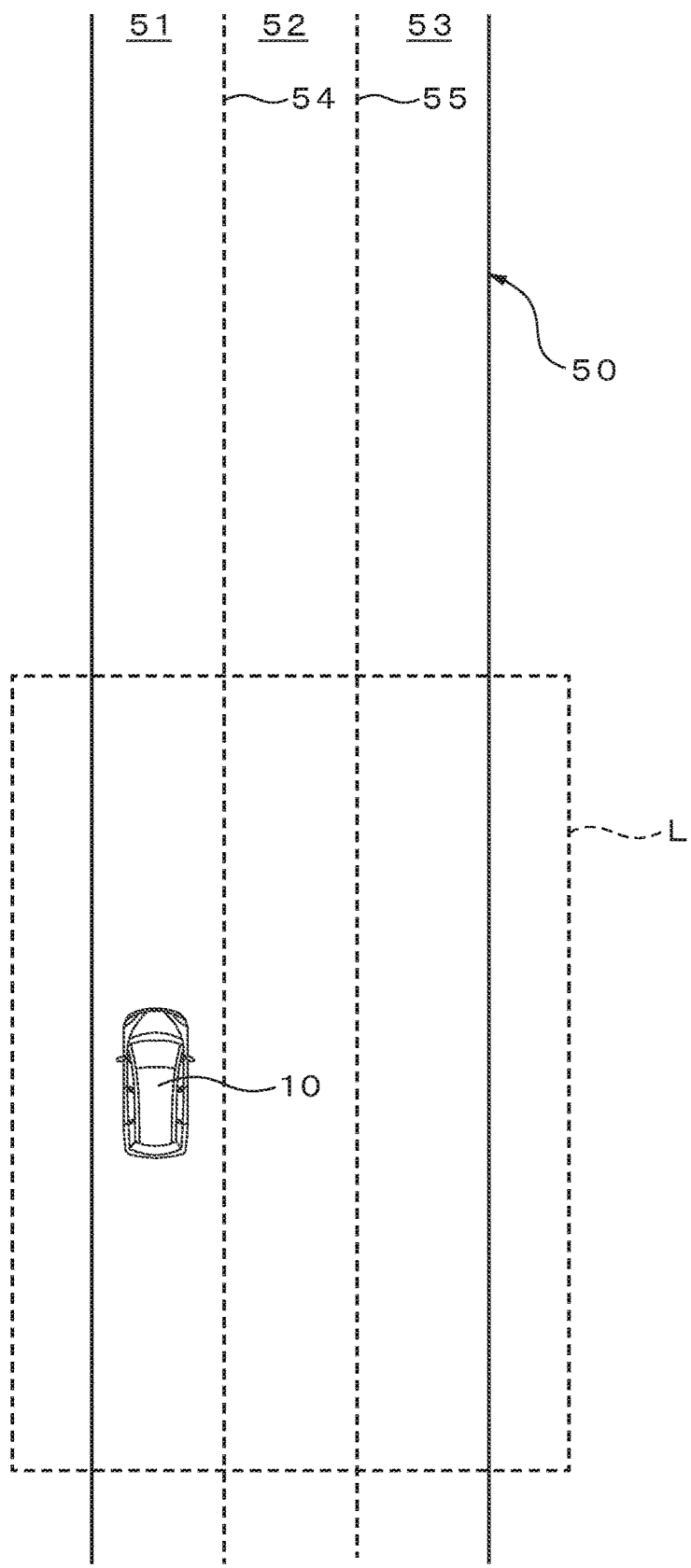
FIG. 7 is a diagram illustrating an operating example for object assessment processing with an object assessment device (4).

In the second operating example shown in FIG. 7, the vehicle 10 is traveling on a traffic lane 51 of a road 50. According to the detection results for the previous detection time point, an object identified by object identification information is not detected in the detection area L.

Figure 8:
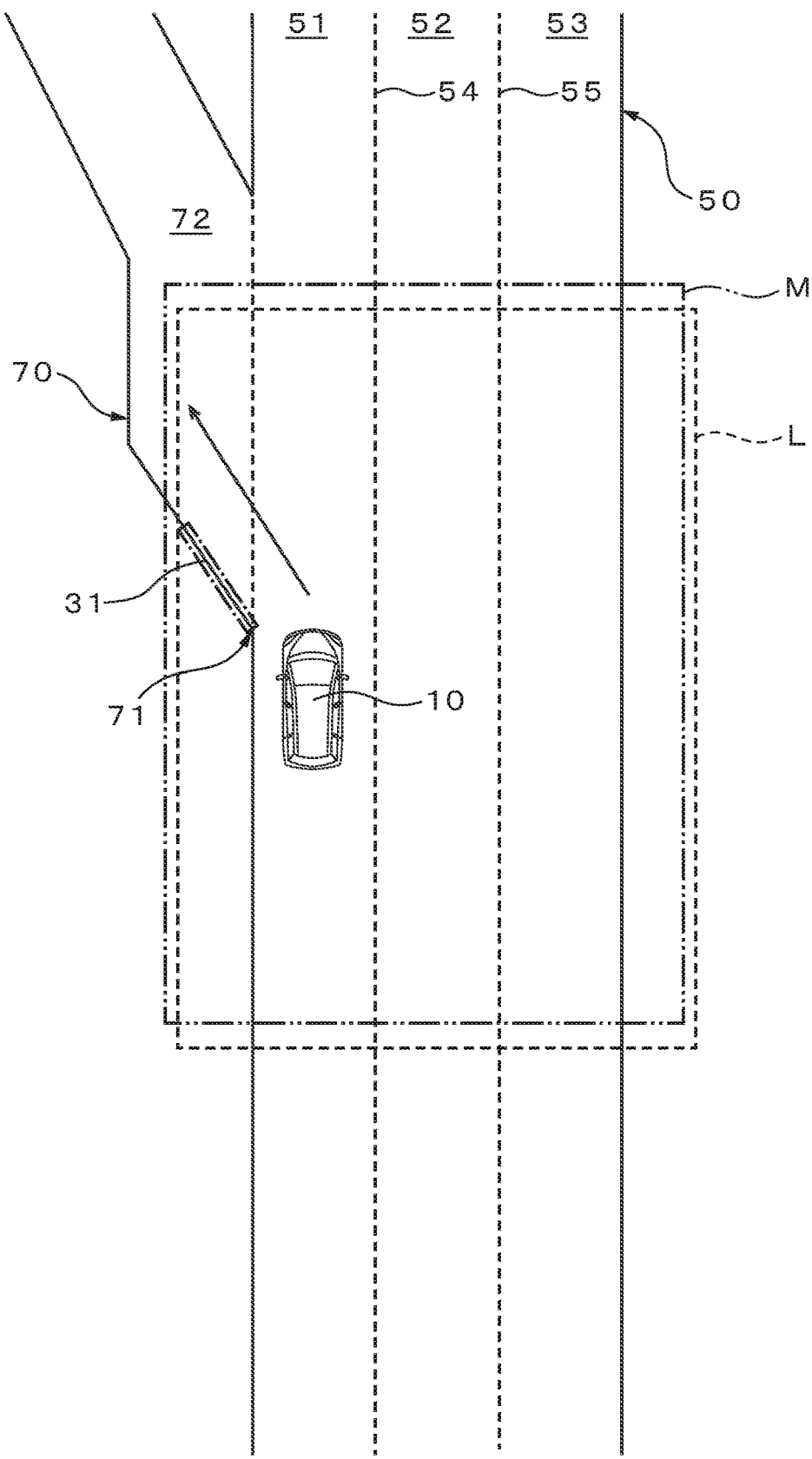
FIG. 8 is a diagram illustrating an operating example for object assessment processing with an object assessment device (5).

As shown in FIG. 8, according to the detection results for the current detection time point, the other object 31 identified by the predetermined object identification information is detected in the detection area L. The object assessment device 13 determines that the object detection information detected at the previous detection time point and the object detection information detected at the current detection time point are not detecting the same object.

In the example shown in FIG. 8, the region M including the location of the vehicle 10 at the current detection time point includes a branching road 70 that branches from the road 50 on which the vehicle 10 is traveling. The branching road 70 branches from the road 50 at the branching location 71. Therefore, the reason why object identification information not included in the previous object assessment information is included in the current object assessment information may be that another object 31 that is not be tracked with object identification information (a structure such as a guard rail or side wall) has been erroneously detected as another object 31 to be tracked. For example, when the vehicle 10 attempts to exit from the road 50 to the branching road 70 at the branching location 71, the side wall of the branching road 70 and the traveling direction of the vehicle 10 are no longer parallel, and therefore the side wall of the branching road 70 is detected as a moving object having a relative speed with respect to the vehicle 10.

The object assessment device 13 determines that the region M including the location of the vehicle 10 at the current detection time point does not satisfy the predetermined terrain condition. Since the detection result in which the other object 31 that is not detected at the previous detection time point was detected at the current detection time point is not valid, it may be that the other object present is not present within the predetermined range from the vehicle 10 at the current detection time point.

When the traveling lane plan includes movement of the vehicle 10 from the lane 51 of the road 50 to the lane 72 of the branching road 70, the traveling lane planning device 14 generates a traveling lane plan for the vehicle 10 which includes exiting from the road 50 to the road 70.

Figure 9:
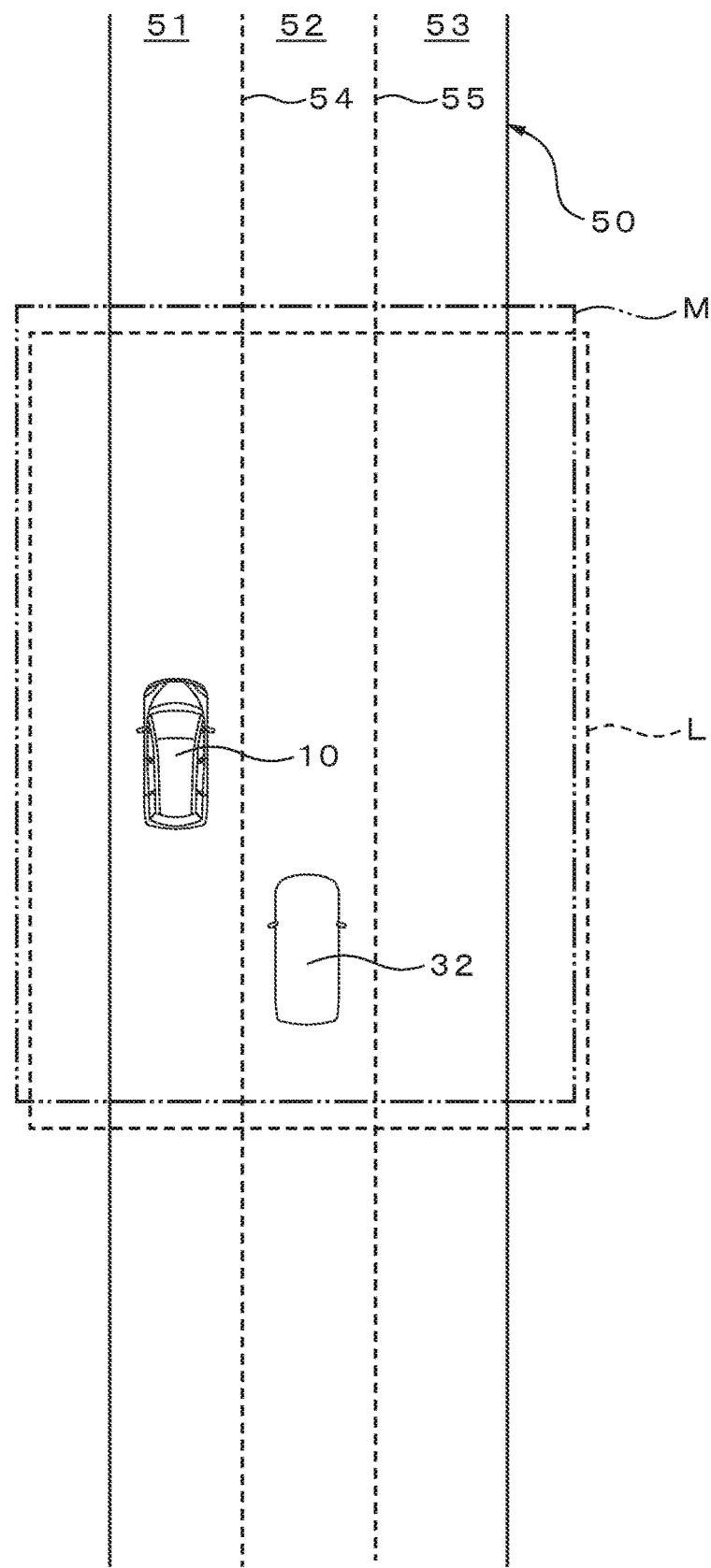
FIG. 9 is a diagram illustrating an operating example for object assessment processing with an object assessment device (6).

In the example shown in FIG. 9, according to the detection results for the current detection time point, the vehicle 32 identified by the predetermined object identification information is detected on the traveling lane 52 in the detection area L.

The region M including the location of the vehicle 10 at the current detection time point does not include the branching road 70 that branches from the road 50 on which the vehicle 10 is traveling. At the current detection time point, a new vehicle 32 to be tracked appears in the detection area L of the object detector 230. Since the detection result in which the vehicle 32 that has not been detected at the previous detection time point is detected at the current detection time point is valid, it may be that the new vehicle 32 to be tracked has appeared in the detection area L of the object detector 230.

The object assessment device 13 determines that the region M including the location of the vehicle 10 at the current detection time point satisfies the predetermined terrain condition. The object assessment device 13 outputs object assessment information indicating that the vehicle 32 detected at the current detection time point is present within the predetermined area L from the vehicle 10, to the traveling lane planning device 14, drive planning device 15 and vehicle control device 16 (notification). The object assessment information includes information indicating the type of vehicle 32 that was detected, the object identification information, information indicating its location, and information indicating its speed, acceleration and traveling lane.

Since the object assessment device of the embodiment described above can determine whether or not the same object is present based on the terrain condition at the second detection time point when the same object has not been detected at a first detection time point and a second detection time point, the valid detection results for an object can be reflected in the vehicle control.

A modified example of the object assessment device of this embodiment will now be described with reference to FIG. 10 and FIG. 11.

Figure 10:
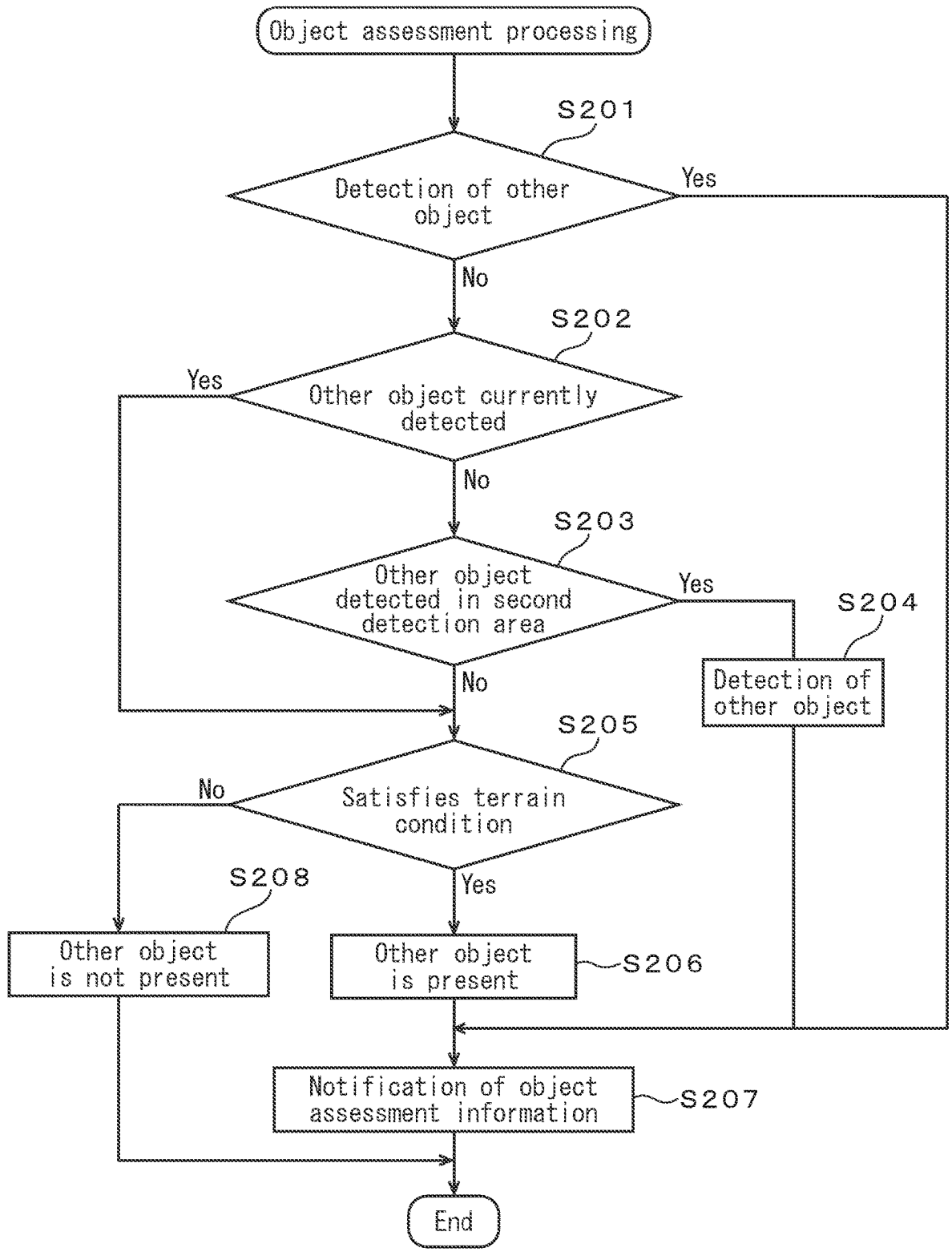
FIG. 10 is an example of an operation flow chart for object assessment processing according to a modified example of the object assessment device of the embodiment.

FIG. 10 is an example of an operation flow chart for object assessment processing according to a modified example of the object assessment device of the embodiment. The object assessment device 13 carries out object assessment processing according to the operation flow chart shown in FIG. 10, at an object assessment time having a predetermined cycle. The cycle of the object assessment time is preferably longer than the cycle of the object detection time.

Processing in step S201 of FIG. 10 is the same as in step S101 of FIG. 3 described above.

When object detection information detected at the previous detection time point and object detection information detected at the current detection time point are not detecting the same object (step S201—No), the assessment unit 231 determines whether or not another object that was detected at the previous detection time point has been detected at the current detection time point (step S202).

When another object that has been detected at the previous detection time point has not been detected at the current detection time point (step S202—No), the assessment unit 231 determines whether or not another object different from the other object identified by the predetermined object identification information that has been detected at the previous detection time point, has been detected within a second detection area N (see FIG. 11), which is narrower than the detection area L at the current detection time point (step S203).

When another object has been detected in the second detection area (step S203—Yes), the assessment unit 231 determines that the object detection information detected at the previous detection time point and the object detection information detected at the current detection time point are detecting the same object (step S204), and processing proceeds to step S207.

On the other hand, when another object has not been detected at the second detection area (step S203—No), or not the case that another object detected at the previous detection time point has been detected at the current detection time point (step S202—Yes), processing proceeds to step S205. Processing in step S205 to step S208 of FIG. 10 is the same as in step S102 to step S105 of FIG. 3 described above.

An operating example for object assessment processing as a modified example of the object assessment device 13 will now be explained with reference to FIG. 4 and FIG. 11.

As shown in FIG. 4, according to the detection results at the previous detection time point, a vehicle 30 traveling on the lane 53 is detected in the detection area L. The vehicle 30 is identified by predetermined object identification information.

Figure 11:
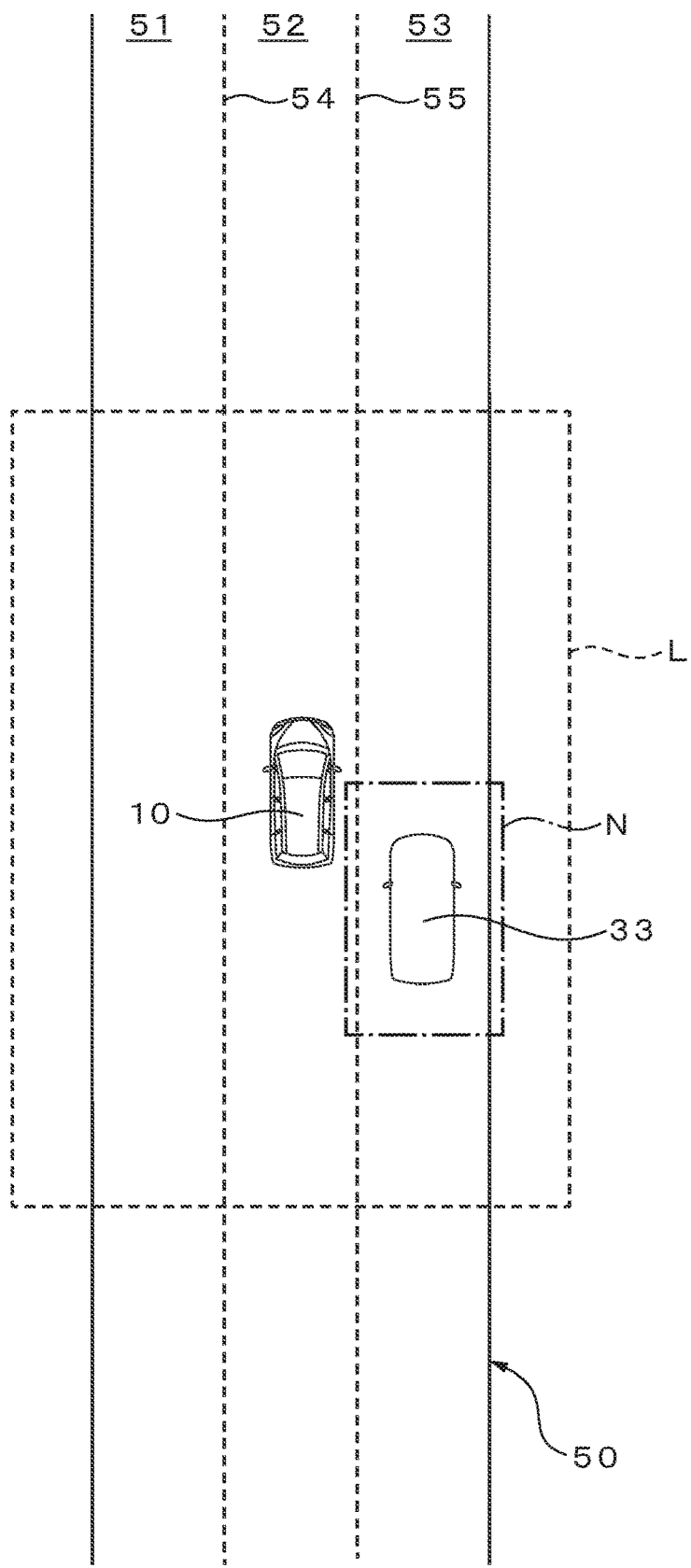
FIG. 11 is a diagram illustrating an operating example for object assessment processing according to a modified example of an object assessment device.

As shown in FIG. 11, according to the detection results for the current detection time point, the vehicle 30 identified by the predetermined object identification information was not detected in the detection area L, but a vehicle 33 different from the vehicle 30 detected at the previous detection time point was detected in the second detection area N. The vehicle 33 is identified by predetermined object identification information different from that of the vehicle 30.

The second detection area N is preferably an area such that a sensor detecting other objects tends to erroneously detect or lose sight of other objects, based on reflected waves such as with the LiDAR sensors $3a$ to $3d$, affected by the relationship between the location of the vehicle 10 and the map information. For example, since reflection waves are often reflected by structures such as guard rails or walls in the side areas of the vehicle 10, other objects tend to be erroneously detected in this area. The sides of the vehicle 10 may therefore be the second detection area N. Since no reflected waves are produced at the front and rear of a vehicle if no other vehicle is present, they are areas less likely to have other objects erroneously detected.

In the example shown in FIG. 11, the second detection area N is set to be on the right side of the vehicle 10. The size of the second detection area N may be set so as to include one other vehicle (normal sized automobile), for example.

The second detection area may also be set to be on the left side of the vehicle 10. The second detection area N is included in the detection area L.

Although the vehicle 30 has been lost from sight, it is highly possible that the vehicle 33 is the same vehicle as the vehicle 30. The object assessment device 13 therefore determines that the object detection information detected at the previous detection time point and the object detection information detected at the current detection time point are detecting the same object.

The object assessment device 13 attaches the object identification information of the vehicle 30 to the vehicle 33. Object assessment information indicating that the vehicle 30 detected at the current detection time point (vehicle 33) is present within the predetermined area L from the vehicle 10, is output to the traveling lane planning device 14, drive planning device 15 and vehicle control device 16 (notification). The object assessment information includes information indicating the type of vehicle 30 (vehicle 33) that was detected, the object identification information, information indicating its location, and information indicating its speed, acceleration and traveling lane.

The object assessment device, computer program for object assessment and object assessment method according to the embodiments described in the present disclosure may incorporate appropriate modifications that fall within the gist of the disclosure. Moreover, the technical scope of the disclosure is not limited to these embodiments, and includes the invention and its equivalents as laid out in the Claims.

For example, the first detection time point was a previous detection time point and the second detection time point was the current detection time point, but the first detection time point and second detection time point need only be at predetermined timings including time points from the past to the present.

Moreover, in the embodiment described above, the other objects were detected using object detection information output from cameras and LiDAR sensors, but the other objects may also be detected using object detection information output from only one of the sensors from among the cameras and LiDAR sensors.

The object detector, assessment unit and notification unit in the embodiment described above were also incorporated into a single device, but the object detector, assessment unit and notification unit may also be incorporated into different devices.

The invention claimed is:

1. An automatic control system for a host vehicle, the system comprising:
a communication interface operatively connectable to at least one of a positional sensor, the positional sensor including at least one of a camera, a LiDAR sensor, and a radar sensor; and
a processor operatively connected to the communication interface and programmed to:
receive a signal from the positional sensor via the communication interface;
at a first timing, analyze the received signal to determine whether an adjacent vehicle is present in a predetermined detection area around the host vehicle, the predetermined detection area having been determined based on a detection range of the positional sensor;
upon a determination that the adjacent vehicle is present in the predetermined detection area at the first timing, assigning object identification information to the adjacent vehicle;
at a second timing, analyze the received signal to determine if an adjacent vehicle is present in the predetermined detection area around the host vehicle;
upon a determination that the adjacent vehicle is present in the predetermined detection area at the second timing, refer to the assigned object identification information to determine whether the adjacent vehicle present in the predetermined detection area at the second timing is the same as the adjacent vehicle present in the predetermined detection area at the first timing;
upon a determination that the adjacent vehicle present in the predetermined detection area at the second timing is the same as the adjacent vehicle present in the predetermined detection area at the second timing, outputting an instruction via the communication interface to delay an automatic lane change operation due to the presence of the adjacent vehicle;
upon a determination that no adjacent vehicle is present in the predetermined detection area at the second timing:
access, via the communication interface, a memory storing map data;
based on the accessed map data, determine whether the predetermined detection area includes a road feature that would allow the adjacent vehicle that was present in the predetermined detection area at the first timing to have moved outside of the detection area;
upon a determination that the predetermined detection area does not include the road feature that would allow the adjacent vehicle that was present in the predetermined detection area at the first timing to have moved outside of the detection area, outputting the instruction via the communication interface to delay an automatic lane change operation due to the possible presence of the adjacent vehicle; and
upon a determination that the predetermined detection area includes the road feature that would allow the adjacent vehicle that was present in the predetermined detection area at the first timing to have moved outside of the detection area, outputting an instruction via the communication interface permitting an automatic lane change operation due to the absence of the adjacent vehicle.

2. The automatic control system according to claim 1, wherein:
the predetermined detection area is a first predetermined detection area; and
the processor is programmed to:
upon the determination that the adjacent vehicle is present in the first predetermined detection area at the second timing, determine whether the adjacent vehicle is present in a second predetermined detection area that is smaller than the first predetermined detection area; and
in response to a determination that the adjacent vehicle is present in the second predetermined detection area, determine that the adjacent vehicle present in the second predetermined detection area at the second timing is the same as the adjacent vehicle present in the first predetermined detection area at the first timing.

3. A computer-readable, non-transitory storage medium storing a computer program for automatically controlling a host vehicle, and which causes a processor execute a process, the process comprising:
  receive a signal from a positional sensor via a communication interface;
  at a first timing, analyze the received signal to determine whether an adjacent vehicle is present in a predetermined detection area around the host vehicle, the predetermined detection area having been determined based on a detection range of the positional sensor;
  upon a determination that the adjacent vehicle is present in the predetermined detection area at the first timing, assigning object identification information to the adjacent vehicle;
  at a second timing, analyze the received signal to determine if an adjacent vehicle is present in the predetermined detection area around the host vehicle;
  upon a determination that the adjacent vehicle is present in the predetermined detection area at the second timing, refer to the assigned object identification information to determine whether the adjacent vehicle present in the predetermined detection area at the second timing is the same as the adjacent vehicle present in the predetermined detection area at the first timing;
  upon a determination that the adjacent vehicle present in the predetermined detection area at the second timing is the same as the adjacent vehicle present in the predetermined detection area at the second timing, outputting an instruction via the communication interface to delay an automatic lane change operation due to the presence of the adjacent vehicle;
  upon a determination that no adjacent vehicle is present in the predetermined detection area at the second timing:
    access, via the communication interface, a memory storing map data;
    based on the accessed map data, determine whether the predetermined detection area includes a road feature that would allow the adjacent vehicle that was present in the predetermined detection area at the first timing to have moved outside of the detection area;
    upon a determination that the predetermined detection area does not include the road feature that would allow the adjacent vehicle that was present in the predetermined detection area at the first timing to have moved outside of the detection area, outputting the instruction via the communication interface to delay an automatic lane change operation due to the possible presence of the adjacent vehicle; and
    upon a determination that the predetermined detection area includes the road feature that would allow the adjacent vehicle that was present in the predetermined detection area at the first timing to have moved outside of the detection area, outputting an instruction via the communication interface permitting an automatic lane change operation due to the absence of the adjacent vehicle.

4. A method for automatically controlling a host vehicle, the method comprising:
  receive a signal from a positional sensor via a communication interface;
  at a first timing, analyze the received signal to determine whether an adjacent vehicle is present in a predetermined detection area around the host vehicle, the predetermined detection area having been determined based on a detection range of the positional sensor;
  upon a determination that the adjacent vehicle is present in the predetermined detection area at the first timing, assigning object identification information to the adjacent vehicle;
  at a second timing, analyze the received signal to determine if an adjacent vehicle is present in the predetermined detection area around the host vehicle;
  upon a determination that the adjacent vehicle is present in the predetermined detection area at the second timing, refer to the assigned object identification information to determine whether the adjacent vehicle present in the predetermined detection area at the second timing is the same as the adjacent vehicle present in the predetermined detection area at the first timing;
  upon a determination that the adjacent vehicle present in the predetermined detection area at the second timing is the same as the adjacent vehicle present in the predetermined detection area at the second timing, outputting an instruction via the communication interface to delay an automatic lane change operation due to the presence of the adjacent vehicle;
  upon a determination that no adjacent vehicle is present in the predetermined detection area at the second timing:
    access, via the communication interface, a memory storing map data;
    based on the accessed map data, determine whether the predetermined detection area includes a road feature that would allow the adjacent vehicle that was present in the predetermined detection area at the first timing to have moved outside of the detection area;
    upon a determination that the predetermined detection area does not include the road feature that would allow the adjacent vehicle that was present in the predetermined detection area at the first timing to have moved outside of the detection area, outputting the instruction via the communication interface to delay an automatic lane change operation due to the possible presence of the adjacent vehicle; and
    upon a determination that the predetermined detection area includes the road feature that would allow the adjacent vehicle that was present in the predetermined detection area at the first timing to have moved outside of the detection area, outputting an instruction via the communication interface permitting an automatic lane change operation due to the absence of the adjacent vehicle.

* * * * *